United States Patent [19]

le Febve de Vivy

[11] 4,049,971

[45] Sept. 20, 1977

[54] OUTPUT REGULATOR FOR A THERMAL POWER-PRODUCING PLANT

[75] Inventor: Dominique le Febve de Vivy, Winterthur, Switzerland

[73] Assignee: Sulzer Brothers Ltd., Winterthur, Switzerland

[21] Appl. No.: 653,595

[22] Filed: Jan. 29, 1976

[30] Foreign Application Priority Data

Apr. 17, 1975 Switzerland ........................ 4896/75

[51] Int. Cl.[2] ........................ H02P 9/04; G05B 11/42; G06F 15/18

[52] U.S. Cl. .................................. 290/40 R; 318/610; 235/150.1; 60/665

[58] Field of Search ......................... 60/664, 665, 667; 290/7, 52, 40; 318/610; 235/150.1

[56] References Cited

U.S. PATENT DOCUMENTS

| | | | |
|---|---|---|---|
| 3,421,014 | 1/1969 | Moorganov | 290/40 R |
| 3,488,961 | 1/1970 | Gerber | 290/40 R |
| 3,545,207 | 12/1970 | Barber et al. | 60/664 |
| 3,609,384 | 9/1971 | Strohmeyer | 290/40 R |
| 3,619,631 | 11/1971 | Strohmeyer | 290/40 R |

*Primary Examiner*—Robert K. Schaefer
*Assistant Examiner*—John W. Redman
*Attorney, Agent, or Firm*—Kenyon & Kenyon, Reilly, Carr & Chapin

[57] ABSTRACT

The regulator having a P-member and an I-member uses a timing means to delay the desired value signal prior to subtraction of the delayed signal from the received actual value signal. The resultant signal is then delivered to the I-member. A further P-member is also used to receive the desired value signal and to deliver the signal for addition to the superimposed signals from the first-named P-member and I-member in order to produce a load-control signal.

5 Claims, 3 Drawing Figures

OUTPUT REGULATOR FOR A THERMAL POWER-PRODUCING PLANT

This invention relates to an output regulator for a thermal power-producing plant.

As is known, thermal power-producing plants frequently use output regulators of the PID type in which an actual value signal dependent on the output power is compared to a desired value signal so that an outlet load-control signal can be produced to regulate the plant should there be deviations from the desired value signal. Generally, the transmission factors of the P-, I- and D-portions of the output-regulator are selected so that disturbances, e.g. a change in the grade of fuel, which affect the fire are rectified in optimum fashion. However, in the case of an abrupt alteration of the desired value signal, a very large deviation of the load-control signal occurs momentarily in the signal line between the output-regulator and the boiler load controller. usually, such a large deviation cannot be accepted in the combustion system to avoid that the required burner load exceeds the normal operation range. Thus, it becomes necessary to impose suitable limits on the gradients for the load-change or for the load-control signal. Both these means, however, have the drawback that they considerably delay a load-change.

Accordingly, it is a object of the invention to improve the output regulator used in thermal power plants.

It is another object of the invention to provide an output regulator for a thermal power plant which optimizes the regulation or the plant even in the event of an abrupt alteration in the desired value of the output.

Briefly, the invention provides an output regulator for a thermal power plant of a basic PI type having two inputs and one output in which the desired value input of the regulator is switched over a timing means to the input of the I-member and over a further P-member, having a smaller transmission factor than the usual P-member, to an addition-place. The timing means delays the desired value signal and allows a comparison of this signal by substraction with the actual value signal received by the regulator. The result is delivered to the I-member of the regulator. The signals emitted by the I-member and the usual P-member are superimposed and then added to the desired value signal which is switched over said further P-member in order to produce a load-control signal for transmission via the output of the regulator.

In accordance with one embodiment, at least one of the two P-members is also of D-character. Also, the retardation-time of the timing means is adjustable.

These and other objects and advantages of the invention will become more apparent from the following detailed description and appended claims taken in conjunction with the accompanying drawings in which:

Figure 1:
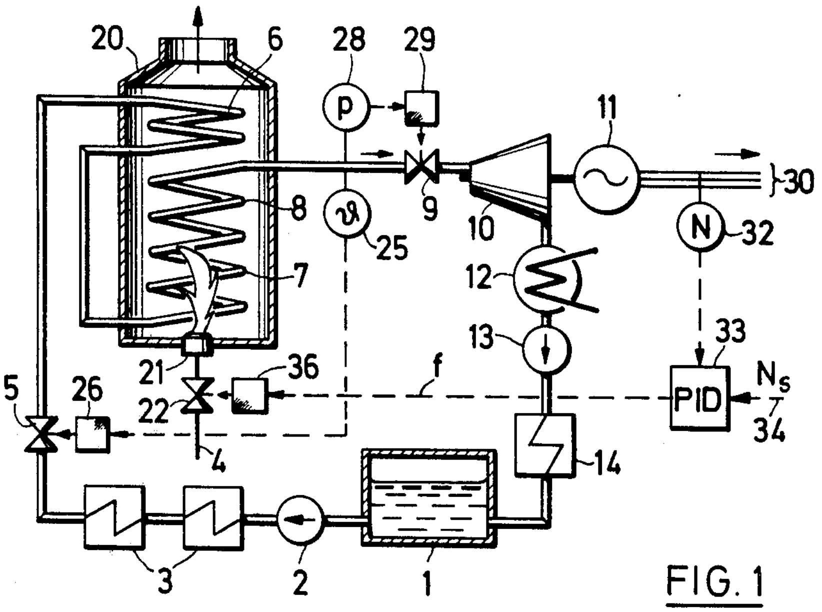
FIG. 1 illustrates a schematic diagram of a thermal power plant utilizing an output regulator of known construction.

Referring to FIG. 1, a steam power plant operated by fossil fuels utilizes a feed-water tank 1, a feed-pump 2, two high-pressure preheaters 3, a feed-valve 5, an economizer 6, an evaporating-surface 7, a superheating-surface 8, a live-steam valve 9, a steam-turbine 10 having an electric generator 11, a condenser 12, a condensate-pump 13, and a low-pressure preheater 14. The heating surfaces 6, 7 and 8, are situated in a housing 20 of the steam generator, and are heated by a burner 21. Fuel is conducted to the burner 21 through a conduit 4, which has a valve 22 for adjusting the quantity of fuel. The supply of air to the burner is not shown but can also be regulated by a valve.

The feed-valve 5 is influenced by a regulator 26, which is associated with a temperature-senser 25 near the superheating surface 8. A pressure-senser 28 is connected in the flow direction of the steam ahead of the live-steam valve 9 and controls the live-steam valve 9 via a pressure-regulator 29. The power supplied by the electric generator 11 to a network 30 is determined by a power-measuring device 32, which through the intermediary of an output-regulator 33 of PID type influences a boiler load-controller 36. The output regulator 33 receives a desired value $N_s$ over a signal line 34. The valve 22 in the fuel supply line 4 is operated from the load controller 36. Additional devices, such as the regulator 26, the not-shown valve for adjusting the air supply, or the not-shown injection valve for regulating the temperature of the live steam, may be also operated for the load-controller 36.

Figure 2:
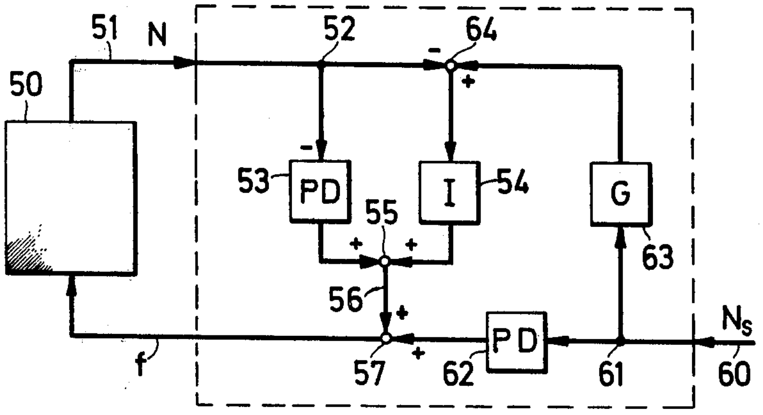
FIG. 2 illustrates a circuit diagram of an output regulator according to the invention.

Referring to FIG. 2, the output regulator is shown connected to a controlled system 50 representative of the dynamic characteristics of the steam generator, steam turbine and electric generator of FIG. 1. The regulator has two inputs and one output. As shown, the controlled system 50 delivers an actual value signal N via signal-path 51 to one input of the regulator which path branches at a point 52. One branch connects the point 52 to the input of a PD-member 53 while the other branch connects the point 52 to a comparison means 64, which is connected with the input of an I-member 54. The outputs of the PD-member 53 and of the I-member 54 are brought together in an addition-means 55, in which there is a super-imposition of the output signals of the two members 53, 54. The PD-member 53 and the I-member 54 are as usual adjusted in optimum fashion to the controlled system 50.

A signal-path 60 which conducts the desired-value signal $N_s$ is branched at a point 61. One branch connects point 61 to a timing means 63, which is connected with the comparison means 64 at the input of the I-member 54. In this comparison means 64 the retarded (i.e. delayed) desired value signal coming from the timing means 63 is compared through subtraction with the actual-value signal of the output coming from the branch point 52, and the difference of these two signals is conducted to the I-member 54. The other branch leaving the point 61 runs to a further PD-member 62, which is connected with an addition means 57, to which the signal coming from the addition means 55 is conducted over a signal line 56. The PD-member 62 has a smaller transmission factor than the PD-member 53, and also the D-portion is weaker. At the addition means 57, the signal formed from the superposing of the outputs from two members 53, 54 is superposed on the signal from the PD-member 62, and the thus-formed sum is conducted to the controlled system 50 as a load-control signal *f*.

Figure 3:
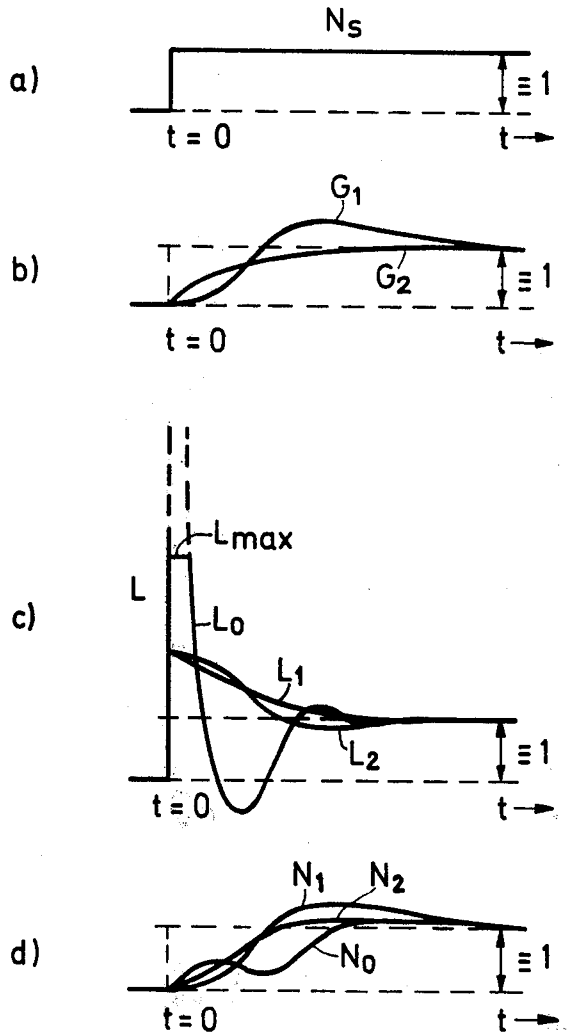
FIG. 3 graphically illustrates the manner of operation of the regulator of FIG. 2.

Referring to FIG. 3, in operation, assuming that an abrupt change of the output desired-value $N_s$ occurs at the time $t = o$ of FIG. 3*a*, the mode of operation of the output regulator of FIG. 2 is as follows. In the diagram 3*b* are two examples of characteristics $G_1$, $G_2$, of the timing means 63, thus showing simultaneously two variants of the pattern of the output signal of the timing means 63 at the occurrence of the abrupt change of the desired-value output. In the diagram 3c is shown by the curves $L_1$ and $L_2$ the pattern of the load-control signal $f$ corresponding to the pattern of the characteristics $G_1$ and $G_2$ respectively. The diagram 3d shows the pattern of the actual-values $N_1$ and $N_2$ of the output at the occurrence of the abrupt alteration of the output desired-value $N_s$.

For comparison, the diagram 3c shows additionally the pattern of the load-signal $f$ of the known output regulator as a curve $L_o$, and the diagram 3d shows the corresponding pattern of the actual-value of the output as the curve $N_o$.

An optimal adjustment of the D-portion in the known output-regulator 33 produces a very great initial deviation of the load-control signal $f$, which corresponds to the pattern of the curve $L_o$. However, the ordinary control of the burner 27 is not able to realize the deviation of the curve $L_o$. Thus, the load-control signal $f$ must be limited to a value $L_{max}$, so that the dotted pattern of the curve $L_o$ is not followed. The relatively great amplification of the P- and I-portions of the known output-regulator has the result that the curve $L_o$, following the initial deviation, falls below the 0-line. As a result, the actual-value signal $N_o$ rises to the steady-state value (FIG. 3d) only after a considerable delay.

With the output-regulator according to FIG. 2, the required rise of output caused by the abrupt alteration of the desired-value signal $N_s$ is reached considerably earlier than with the known output-regulator. This is clearly seen in the diagrams 3c and 3d from the curves $L_1$, $L_2$, and $N_1$, $N_2$, respectively. Here the control system is much less affected, because, as the two diagrams show, the deviations of the curves $L_1$ and $L_2$ and $N_1$ and $N_2$ respectively, are much less.

As is further shown by FIG. 3, the character of the timing means 63 can be altered within relatively wide limits without substantially impairing the favorable action of the output-regulator. This alteration is effected by adjusting the delay-time of the timing means 63.

It is also possible for the member 53 or the member 62 to be only of P-character, or for both members to be only of P-character.

The term "P-member" means a controller with proportional action, the term "I-member" a controller wth integral action and the term "PD-member" a controller with proportional plus derivative actions.

What is claimed is:

1. An output regulator for a thermal power-producing plant comprising a pair of inputs;

an output for emitting a load control signal;

a first P-member connected to one of said inputs to receive an actual value signal;

an I-member connected to said one input to receive said actual value signal;

a second P-member connected to the other input of said inputs to receive a desired value signal, said second P-member having a smaller transmission factor than said first p-member;

a timing means connected to said other input for receiving and delaying said desired value signal, said timing means being connected to said I-member to emit the delayed desired value signal to said I-member;

an addition means connected to said first P-member and said I-member to receive superimposed signals therefrom, said second P-member being connected to said addition means to deliver said desired value signal to said addition means for addition to said superimposed signals to produce the load control signal in response thereof, said addition means being connected to said output to deliver the load control signal thereto.

2. An output regulator as set forth in claim 1 wherein at least one of said P-members also has a D-character.

3. An output regulator as set forth in claim 2 wherein said timing means is adjustable.

4. An output regulator as set forth in claim 1 wherein said timing means is adjustable.

5. An output regulator for a thermal power-producing plant comprising a pair of inputs and an output;

a first P-member connected to one of said inputs to receive an actual value signal therefrom;

a second P-member connected to the other of said inputs to receive a desired value signal therefrom;

a timing means connected to said other input to receive and delay said desired value signal;

a comparison means connected to said one input and said timing means to subtract the delayed desired value signal from the actual value signal to produce a resultant signal;

an I-member connected to said comparison means to receive the resultant signal;

a first addition means connected to said first P-member and said I-member to superimpose signals received therefrom; and a second addition means connected to said first addition means and said second P-member to add said superimposed signals and said desired value signal to produce a load-control signal for delivery to said output.

* * * * *

UNITED STATES PATENT AND TRADEMARK OFFICE
CERTIFICATE OF CORRECTION

PATENT NO. : 4,049,971
DATED : September 20, 1977
INVENTOR(S) : Dominique le Febve de Vivy It is certified that error appears in the above-identified patent and that said Letters Patent are hereby corrected as shown below:

Column 1, line 20 insert a hyphen between the words "load" and "Controller"

Column 1, line 21 change "usually" to -- Usually --

Column 1, line 28 change "a" to -- an --

Column 1, line 32 change "or" to -- of --

Column 2, line 21 insert a hyphen between the words "load" and "controller"

Column 2, line 24 change "for" to -- from --

Column 3,line 49 change "wth" to "with"

Signed and Sealed this

*Seventh* Day of *February 1978*

[SEAL]

*Attest:*

RUTH C. MASON
*Attesting Officer*

LUTRELLE F. PARKER
*Acting Commissioner of Patents and Trademarks*